V. G. APPLE.
GEARING.
APPLICATION FILED APR. 17, 1914.

1,144,092.

Patented June 22, 1915.
2 SHEETS—SHEET 1.

Witnesses
Robert H. Weir
Arthur W. Carlson

Inventor
Vincent G. Apple,
by Toulé Bain May
(Attys.)

V. G. APPLE.
GEARING.
APPLICATION FILED APR. 17, 1914.

1,144,092.

Patented June 22, 1915.

2 SHEETS—SHEET 2.

Witnesses
Robert H. Weir
Arthur W. Carlson

Inventor
Vincent G. Apple
by Jones & Bain May
Attys.

UNITED STATES PATENT OFFICE.

VINCENT G. APPLE, OF DAYTON, OHIO, ASSIGNOR TO THE APPLE ELECTRIC COMPANY, OF DAYTON, OHIO, A CORPORATION OF OHIO.

GEARING.

1,144,092.  Specification of Letters Patent.  Patented June 22, 1915.

Application filed April 17, 1914.  Serial No. 832,474.

*To all whom it may concern:*

Be it known that I, VINCENT G. APPLE, a citizen of the United States, residing at Dayton, in the county of Montgomery and State of Ohio, have invented certain new and useful Improvements in Gearing, of which the following is a specification.

My invention relates to gearing and has especial reference to gearing for changing the speed relation between a dynamo electric machine and a machine to be driven by or to drive said dynamo.

One of the objects of my invention is to provide a gearing that is especially well adapted for use with a dynamo electric machine; that is compact; of few parts and that may be contained, conveniently, within and protected by the dynamo casing.

Another object of my invention is to provide a gearing, of which the head, or end closure of the dynamo casing is a component part or member, thereby reducing the number of parts to a minimum and decreasing the cost of production.

Other and further objects of my invention will become readily apparent to persons skilled in the art, from a consideration of the following description when taken in conjunction with the drawings, wherein—

Figure 4:
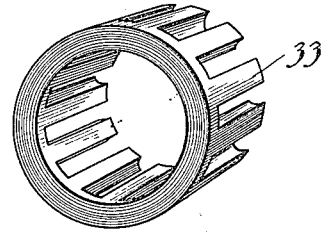
Figure 1:
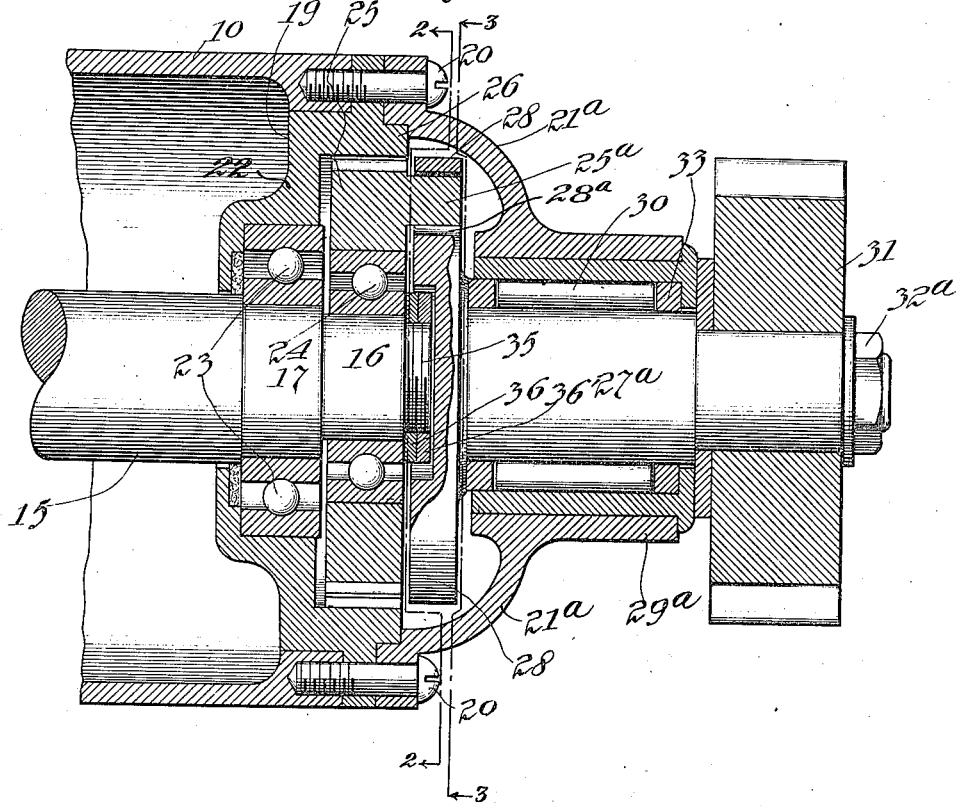
Figure 2:
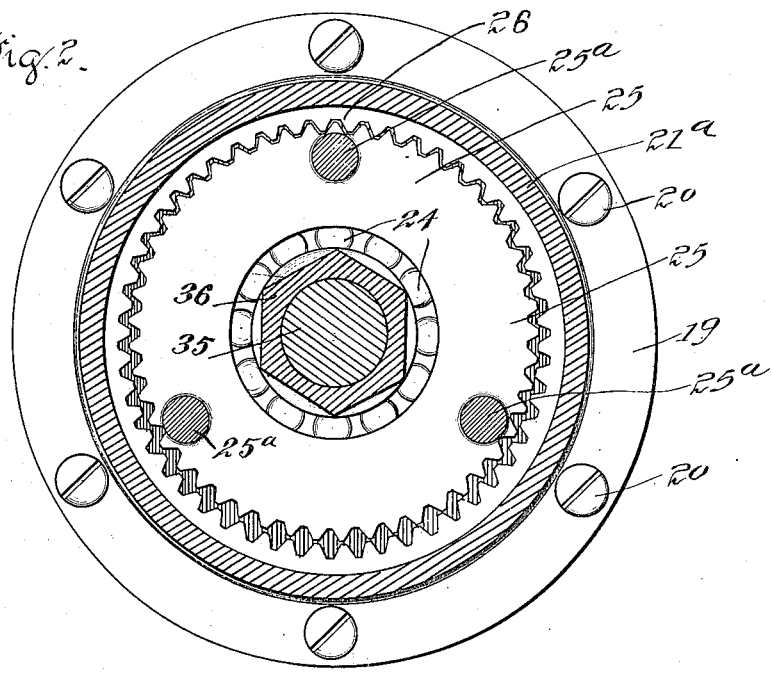
Figure 3:
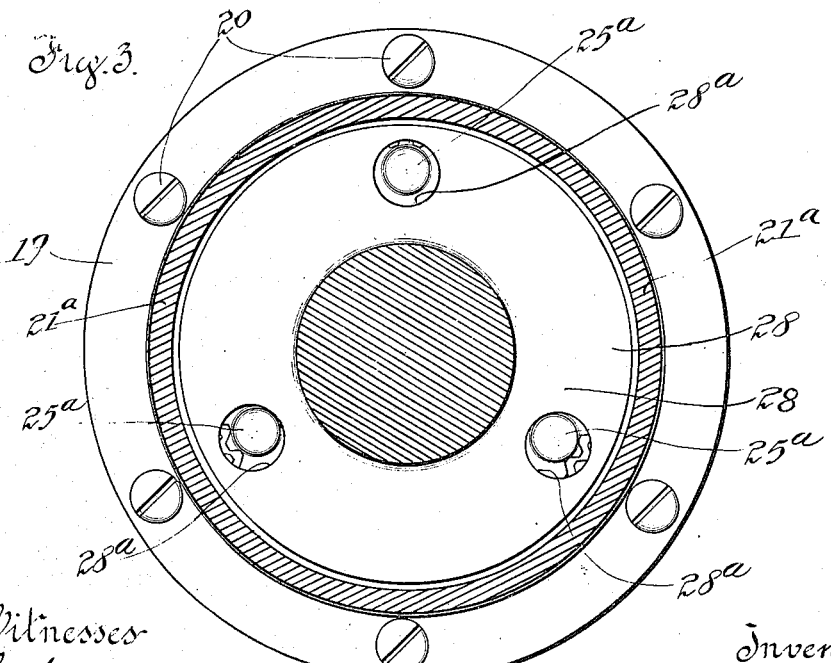

Figure 1 is a vertical axial sectional view of the drive end of a dynamo electric machine. Fig. 2 is a transverse section, taken on line 2—2 of Fig. 1. Fig. 3 is a similar view taken on line 3—3 of Fig. 1. Fig. 4 is a perspective view of the cage for a roller bearing, that is preferably used in my structure.

In all the views the same reference characters are employed to indicate similar parts.

In the particular showing 10 is the casing of a dynamo electric machine, the shaft 15 of which is provided with an eccentric portion 16. The fixed head or closure 19 of the driving end of the casing 10 is secured thereto by screws 20. The screws 20 also serve for fastening the cup shaped cover 21ª which is employed to completely inclose the gearing in the frame of the dynamo. The head 19, is provided with a hollow hub 22 containing the ball bearing 23, that is located between the concentric portion 17, of the shaft, and the interior of the said hub to afford bearing for the armature shaft 14. Another ball bearing, 24, is contained between the eccentric portion 16 of the shaft and the radially movable gear wheel 25. The head 19 is provided with a preferably, integral, internal gear 26, with which the radially movable gear 25 meshes when it is radially and progressively moved by the rotation of the eccentric 16 of the shaft 15. The radially movable gear wheel 25 is provided with a plurality of laterally projecting studs 25ª.

A shaft 27 27ª carries on its inner end a disk 28. The disk 28 is perforated, as at 28ª to receive the studs 25ª. The perforations in the disk are considerably larger than are the studs 25ª to permit considerable latitude of movement of the studs therein. Either member, the gear wheel or the disk may carry the studs and the other may contain the perforations. The gear 25 has a less number of teeth than the stationary internal gear 26. In the particular exemplification the radially movable gear wheel 25 has 49 teeth while the stationary internal gear, 26, is provided with 50 teeth. Therefore the hollow shaft 27 will be rotated one revolution for every fifty revolutions of the armature shaft 15, when the latter is the driver, but in this particular instance the gear 25 and shaft 27 will be rotated in the direction opposite to that in which the shaft 15 will be rotated by the armature 14. In other words, should the armature be rotated in clock wise direction, when facing the gear wheel 25, the hollow shaft 27 will be rotated in an anti-clock wise direction. Should the spur gear wheel 25 contain more teeth than the stationary internal gear 21 then the two shafts will rotate in the same direction. A gear wheel 31 is secured to the shaft 27, as by means of a nut 32ª.

The roller bearing 30 and its cage 33 for the driven shaft 27ª is carried by the hub extension 29ª of the casing cap 21ª. The shaft 27ª and the disk 28 are integral parts. The shaft 15 terminates as at 35, the ball bearing 24 being held thereon by the threaded nuts 36—36'.

For purposes of identification I have called shaft 15 the driving shaft and shaft 27ª the driven shaft.

Having described my invention, what I claim is:—

1. In combination with a casing, a shaft bearing, a head for the casing, providing one member of a reduction gearing and a support for the said bearing, a shaft within said bearing; a coöperating gear member, driven by said shaft, and within said head, a cover connected with said casing, a driven shaft supported by said cover, and a connection between said gearing and driven shaft.

2. The combination with a casing and driven shaft, of a casing head, a gear carried thereby, and adapted to serve as one member of a reduction gearing, a driving shaft bearing supported by said head, a gear member driven by said shaft and coöperating with the aforesaid gear, a cover connected with the casing and projecting beyond the gearing, a driven shaft supported by said cover and a connection between said gearing and the driven shaft.

3. The combination with a casing and a driving shaft, of a bearing for said shaft, a casing head providing one member of a reduction gearing and a support for said bearing, a coöperating gear member driven by said shaft, a cup shaped cover connected at its periphery to the casing and inclosing said gearing, a driven shaft, a connection between said gearing and the driven shaft, and a bearing for the driven shaft mounted in said cover.

In testimony whereof I hereunto set my hand in the presence of two subscribing witnesses.

VINCENT G. APPLE.

In the presence of—
N. E. SNYDER,
E. M. EARNHART.